United States Patent Office 2,700,618
Patented Jan. 25, 1955

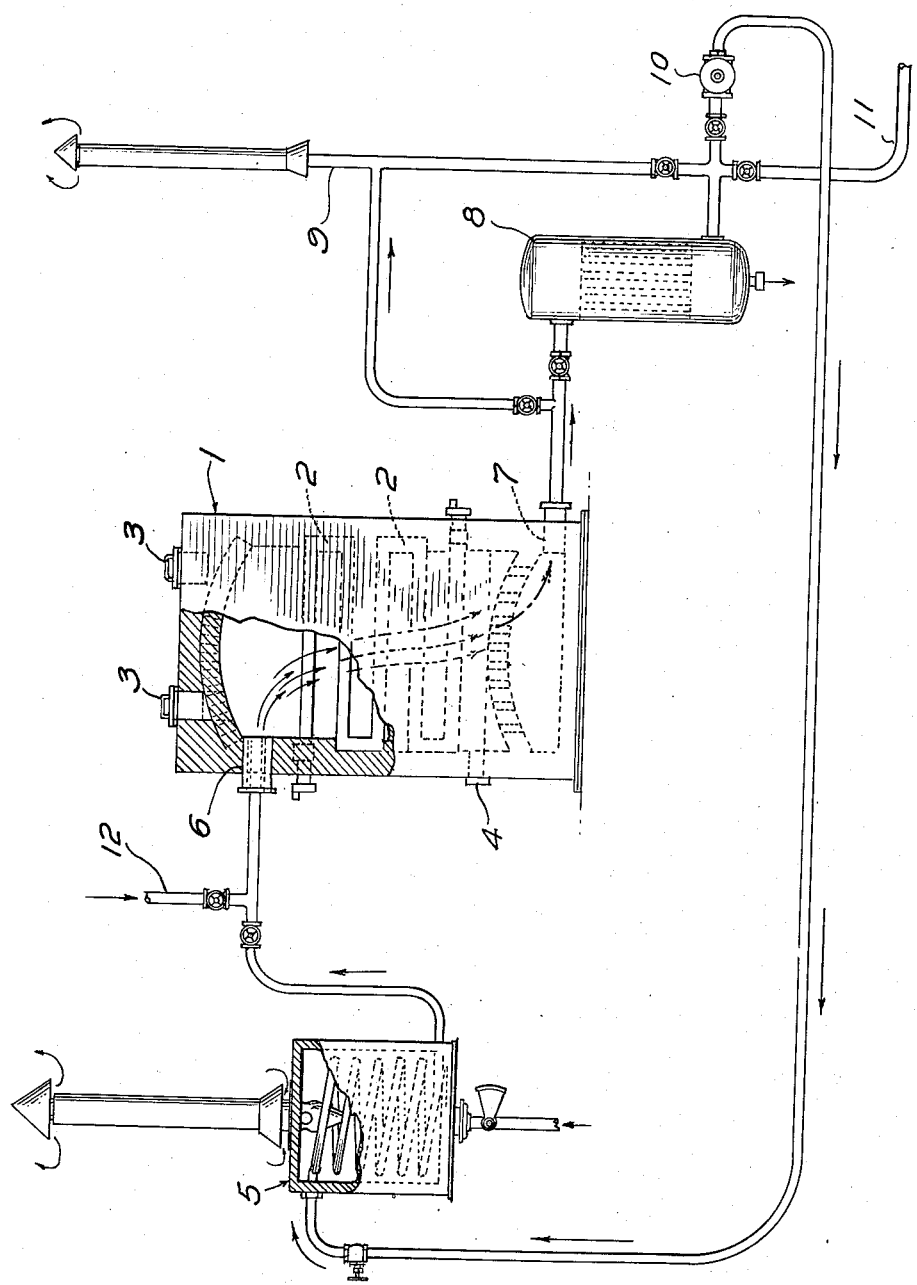

2,700,618

MANUFACTURE OF ULTRAMARINE

William J. Kruppa, Somerville, and George J. Marlowe, Bound Brook, N. J., assignors to American Cyanamid Company, New York, N. Y., a corporation of Maine Application April 22, 1952, Serial No. 283,674

4 Claims. (Cl. 106—305)

This invention relates to an improved process for the manufacture of ultramarine.

Ultramarine is produced in two steps, the first of which involves high temperature heating of the charge, which is a mixture of aluminum silicates, sulfur, reducing agent and alkali such as sodium carbonate. In the first step, oxidizing and other reactive gases such as acid gases must be kept from the charge. The resulting product, primary ultramarine, must then be cautiously oxidized to produce the strong blue pigment of commerce, which is also sometimes referred to as secondary ultramarine, but for the best product oxidation is normally effected at considerably lower temperatures than those required for the production of primary ultramarine.

For about a century after the synthetic ultramarine process had been developed, the two steps were effected in crucibles of controlled porosity. These crucibles, which are about 9 inches in diameter, serve two important functions. First, they sub-divide the ultramarine charge into small uniform portions so that it is possible to transmit heat into the center of the portions, and secondly, they keep excessive amounts of deleterious gases away from the charge, both during the first step of forming primary ultramarine and in the second step of oxidation or conversion to secondary ultramarine.

In the crucible process, the time cycle is very long. Even with the best improvements which have been developed, it still takes about two weeks. The reason for this is that the heating step takes several days because of the slow conduction of heat into the center of the crucibles and the conversion step takes a long time because only a very small amount of oxidizing gas passes through the pores of the crucible wall. These pores have to be very small, for otherwise serious overoxidation of the outer layers of the crucible charge is likely to occur, which would destroy the product for pigment purposes, transforming it into a dirty bluish-gray material.

In addition to the long time cycle required in the crucible process, the quality of the product has never been uniform even in a single crucible, much less in a furnace batch. Since the conversion step involves the slow diffusion of oxygen or oxidizing gases through the pores of the crucible, it is impossible to effect the necessary control with the result that overoxidation occurs in the outer layers of the crucible charge, underoxidation occurs in the center, and in between there is an annulus of reasonably high grade ultramarine. The production of a certain proportion of low grade material reduces the yield in a given furnace and further adds to the cost. Also, the impossibility of exact control results in a variation, from batch to batch, in the shade of the ultramarine produced. This has often necessitated the use of large storage facilities to permit blending, so as to produce a fairly uniform saleable product.

Muffle furnaces of relatively small dimensions have been and are being used for the production of ultramarine blue. This process, however, is even slower than the crucible process and produces a very nonuniform product, only a part of which is useful pigment.

It has been proposed to utilize coke-oven type furnaces to manufacture ultramarine blue. This proposal is not of practical utility because it is not possible, under ordinary operating conditions, to keep the portions of the furnaces containing the ultramarine gastight and, as a result, undesired reactions take place. Long time cycles are necessary. These disadvantages are the same as for muffle furnaces.

In recent years, a greatly improved ultramarine process has been developed which includes three features. The first and most important is the use of sulfur dioxide in the conversion step. This compound oxidizes primary ultramarine to secondary ultramarine, but it does not have a sufficiently high oxidation potential to overoxidize the material. This feature is described and claimed in the Beardsley and Whiting Patent No. 2,441,951. The second feature is the use of a briquetted ultramarine mix instead of a loose mix. This feature is described and claimed in the Beardsley and Whiting Patent No. 2,441,950. The third feature is a two-step process in which the first step is carried out in crucibles which do not permit any acid gases to enter the charge, and the second step is effected in an open furnace by means of sulfur dioxide. This is described and claimed in the Beardsley and Whiting Patent No. 2,441,952.

The improvements developed by Beardsley and Whiting permit very marked savings. The cycle can be shortened if a two-step process is used with sulfur dioxide, the time being reducible to the order of a week or less. There is no overoxidized or underoxidized secondary ultramarine, and the quality of the product can be maintained uniform. A further improvement in the initial step of producing primary ultramarine is described in the Kruppa et al. Patent No. 2,442,173, in which the production of primary ultramarine in gas-impervious crucibles is effected in a tunnel kiln which permits a cycle of 24 hours for this step.

Great as the improvements by Beardsley, Whiting and Kruppa are, they still do not solve an additional problem, which is of great economic importance, or at least their solution is not a perfect one. When primary ultramarine is formed, the mix contains an excess of sulfur, approximately twice as much sulfur as appears in the final pigment. All of this excess sulfur is lost in the old crucible process because part of it is driven off in the heating, and the rest is oxidized in the second step. When sulfur dioxide is used as an oxidizing agent in the Beardsley and Whiting process, it is theoretically possible to recover this additional sulfur as elemental sulfur. However, in the past, engineering and other considerations have made this recovery difficult and in some cases impracticable. The cost of the excess sulfur represents a substantial portion of the raw material cost for ultramarine, and with the increasingly short supplies of sulfur throughout the world, it is a factor of ever-growing importance. Also, even with the Beardsley and Kruppa tunnel kiln, the time cycle is still several days, in spite of the high cost of this type of plant.

The present invention solves the remaining problems concerning the manufacture of ultramarine. It permits substantially complete recovery of excess sulfur in the elemental form, a 24 hour cycle is readily achieved, the advantages of the briquetted mix and sulfur dioxide oxidation of primary ultramarine are fully retained, and the equipment is small, compact, and relatively very cheap when compared to the Beardsley and Kruppa tunnel kiln. A further substantial saving is effected by eliminating the fairly costly crucibles.

According to the present invention, the various steps in ultramarine manufacture are carried out in a gastight electric resistance furnace. It is obviously simple and easy to distribute heating electrodes so as to avoid large thicknesses of ultramarine mix and maintain a maximum distance of from 4 to 6 inches, through which heat has to be transmitted. The construction of a gastight electric furnace is also a known engineering possibility. However, ordinary electric furnaces cannot be used in the production of ultramarine. Standard resistance materials such as bars of silicon carbide are attacked by the ultramarine mix and are so rapidly destroyed that the process becomes prohibitively expensive.

According to the present invention, we have found that it is possible to use carbon resistance elements. This was unexpected because carbon itself or carbon compounds are used as reagents in the ultramarine mix producing primary ultramarine and this step requires as one of its essential features the reaction of carbon with other elements of the ultramarine mix to reduce it and produce carbon dioxide. For some reason, which we have not as yet determined, carbon electrodes are not seriously attacked even at the high temperature of up to 800° C. at which they are operated during a portion of the process. Why the highly heated carbon in the electrodes shows this amazing inertness in a reaction where one of the reagents is carbon is not known and it is not desired to limit the present invention to any theories as to why the carbon in the glowing electrodes does not react, whereas the carbon in the ultramarine mix, even though at somewhat lower temperatures, does react. Nevertheless, it is a fact that the life of a carbon electrode compares favorably with electrode lives in other electric furnace operations; a minimum life of six months for a three by eight inch cross section electrode is readily obtained. The electrode cost in the process is therefore negligible.

It is an advantage of the present invention that ordinary commercial graphite electrodes can be used satisfactorily without any modification. In a more specific aspect of the invention, however, we have found that if the electrode is brushed with a thin coating of sodium silicate solution before it is used, the attack on the electrode is even further reduced, making operating times up to a year or more practical.

The electric furnace can be built as a very compact piece of apparatus, and gastightness is no engineering problem. It is, therefore, easily possible to cool with inert gases such as nitrogen and to recover sulfur by using a mixture of nitrogen and the oxidizing agent in the conversion step. The recovery of the elemental sulfur, that is, the sulfur driven off in the heating up stage before the primary ultramarine is formed as well as the sulfur given off during oxidation, which is thus made possible is an important factor contributing to the economic success of the invention. With properly insulated furnaces, the cost for electric heating is quite low and in many locations represents a great saving over the fuel cost required in the crucible process, where the great weight of brickwork and crucibles required a large fuel consumption.

In order to charge and discharge electric furnaces easily, it is desirable to use a non-caking ultramarine mix. A non-caking mix is also necessary so that adequate voids may be present in the mix so as to permit the passage of gases therethrough. A loose ultramarine mix tends to cake in the production of the primary ultramarines and hence is undesirable. Although the invention is not limited thereto, we prefer to operate with a briquetted mix such as described in the Beardsley et al. Patent No. 2,441,950. It is to be understood, however, that the exact size and shape of the particles of the mix is not critical, that is, it need not be in the form of briquets but may be pelleted or the like. It suffices for the present invention just so long as the mix is non-caking and, therefore, relatively free-flowing.

It is an advantage of the present invention that the improved oxidation step in the Beardsley and Whiting Patent No. 2,441,951 can be effectively used, and additional sulfur which is produced with $SO_2$ as the oxidizing agent is, of course, recovered in the same manner as is the sulfur driven off during the firing stage. It is possible to use any other oxidizing gaseous mixture provided, of course, that the necessary care is used to prevent overoxidation where an oxidizing gas of higher oxidation potential is employed. The accurate flow which is possible in a compact gastight furnace makes it possible to obtain satisfactory results with stronger oxidizing gases than is possible in the crucible process. The advantages of the Beardsley and Whiting $SO_2$ oxidation, while fully exploited by the present invention, are not as essential thereto as in processes where precise control of the flow of oxidizing gases is not practical. This additional flexibility of the present invention is therefore a feature which permits the widest choice of operating conditions.

It is an advantage of the present invention that there is no change in the nature of the ultramarine mix required. In other words, the present invention requires no different raw materials than those which are customarily used. Naturally, of course, it is desirable to use ultramarine mixes which give the best products. For example, while the process can be used with mixes that produce low sulfur ultramarines, normally the modern high sulfur ultramarine will be produced because of its superior quality and tinctorial strength.

The invention will be described in greater detail in conjunction with the accompanying drawing which shows in semi-diagrammatic form and partly in section, a typical plant.

In the drawing, the ultramarine furnace is shown at 1. It is provided with a series of spaced series-connected graphite resistance elements or electrodes 2 which are connected to a suitable source of low voltage high current by conventional means which are not shown. The furnace is charged through charging doors 3 and finished ultramarine can be discharged through discharge port 4.

The furnace is charged with briquets of ultramarine mix, for example about 18,000 lbs. of the following composition:

822 parts of china clay
112 parts of diatomite
743 parts of soda ash
665 parts of sulfur
60 parts of rosin Current is turned on and the electrode temperature is raised to approximately 775° C. at a predetermined rate of rise in the order of 50 to 100° C. (or more) per hour. This electrode temperature is maintained, preferably thermostatically, until the portions of the charge farthest from the electrodes reach a temperature of 700–750° C. During this heating up stage, gases and sulfur vapor are driven off the mix and are passed to a recovery system to recover the excess sulfur. In a furnace of the size described, the heating up of the electrodes will take approximately eight hours, and they are maintained at the maximum temperature for about two hours, which is sufficient to complete primary ultramarine formation when the spacing of the electrodes is such that the maximum distance for heat travel does not exceed 6 inches. Thereupon, hot nitrogen from gas fired heater 5 is circulated through the charge to cool the latter. The temperature of the nitrogen is not critical, but may advantageously be approximately 250° C. The flow passes into the furnace through gas inlet port 6 and out through outlet port 7. The flow of nitrogen is preferably regulated so that the charge is cooled to 250–350° C. in about four hours. Thereupon, the composition of the circulating gas is changed to about 10% $SO_2$ and 90% nitrogen, which can be obtained from a conventional $SO_2$ generator (not shown). The oxidation reaction is exothermic, and with an inlet temperature of about 250° C., the charge will heat up to about 350°–400° C. This latter temperature is controlled by the rate at which $SO_2$ is fed into the circulating gas stream and hence the $SO_2$ content of the circulating gas is variable. The oxidation step requires about five hours for completion.

During the oxidation step, the gases are led through outlet port 7 into a sulfur condenser 8 where free sulfur is condensed out. The gases may then be vented to the atmosphere through vent 9 and small amounts of unreacted $SO_2$ may first be removed if desired. The major portion of the gas is, however, recirculated by pump 10, receiving additional $SO_2$ through pipe 11.

When the oxidation step is complete, the charge is cooled down to 100–150° C., preferably with steam, which requires about three hours. The steam is introduced from pipe 12 through inlet port 6, the nitrogen being shut off. On leaving through outlet port 7, the valves are adjusted so that the steam does not pass through the sulfur condenser, but is vented directly to the atmosphere through vent 9. After the charge is cooled, it is discharged and the furnace recharged, which operation takes approximately two hours, giving an over-all cycle of about 24 hours. The above figures are approximate for a large furnace, and will vary somewhat with the size of the furnace and with the particular operating conditions. The time, however, is cut from a matter of weeks for the old crucible process, and from nearly a week for the Beardsley and Whiting process, to one day.

The operation of a typical furnace described above has been in conjunction with the use of $SO_2$ in the conversion step. Similar operating times are possible when other oxidizing gases are used. The invention is, however, in no sense limited to the use of $SO_2$ in the conversion step, although for many purposes it does represent a very desirable and practical embodiment.

We claim:
1. A process of producing ultramarine which comprises charging a non-caking ultramarine mix into a gastight electric resistance furnace provided with carbon electrodes, heating the mix by means of the resistance electrodes to a temperature of about 700–750° C. so as to form primary ultramarine maintaining the temperature at this point until the reaction is complete, passing a stream of nitrogen through the charge so as to cool the charge to a temperature of about 250–350° C., passing a stream of an oxidizing gas containing $SO_2$ as its principal oxidizing component through the charge so as to convert the primary ultramarine to secondary ultramarine, cooling the charge in the furnace and recovering the ultramarine therefrom.

2. A process according to claim 1 in which the carbon electrodes are coated with a thin coating of sodium silicate.

3. A process according to claim 1 wherein the sulfur driven off during the heating of the ultramarine mix to reaction temperatures is recovered by condensation.

4. A process according to claim 3 in which the carbon electrodes are coated with a thin coating of sodium silicate.

References Cited in the file of this patent

UNITED STATES PATENTS

| | | |
|---|---|---|
| 2,441,952 | Beardsley et al. | May 25, 1948 |
| 2,535,057 | Gessler et al. | Dec. 26, 1950 |
| 2,544,695 | Kumins | Mar. 13, 1951 |